United States Patent
Sloan

(10) Patent No.: US 11,023,543 B2
(45) Date of Patent: Jun. 1, 2021

(54) INCENTIVIZED ELECTRONIC PLATFORM

(71) Applicant: Fan Label, LLC, Birmingham, MI (US)

(72) Inventor: Jeffrey M. Sloan, Birmingham, MI (US)

(73) Assignee: Fan Label, LLC, Birmingham, MI (US)

( * ) Notice: Subject to any disclaimer, the term of this patent is extended or adjusted under 35 U.S.C. 154(b) by 443 days.

(21) Appl. No.: 15/637,844

(22) Filed: Jun. 29, 2017

(65) Prior Publication Data

US 2019/0005136 A1 Jan. 3, 2019

(51) Int. Cl.
*G06F 16/9535* (2019.01)
*G06F 16/61* (2019.01)
*G06F 16/638* (2019.01)
*G06F 16/9537* (2019.01)
*G06F 16/9536* (2019.01)

(52) U.S. Cl.
CPC .......... *G06F 16/9535* (2019.01); *G06F 16/61* (2019.01); *G06F 16/638* (2019.01); *G06F 16/9536* (2019.01); *G06F 16/9537* (2019.01)

(58) Field of Classification Search
CPC .. G06F 16/9535; G06F 16/637; G06F 16/639; G06F 16/24578; G06F 16/24575; G06F 16/904; G06F 3/0482; G06F 3/0481; G06F 16/34; G06F 16/4387; G06F 17/5009; G06F 16/29
See application file for complete search history.

(56) References Cited

U.S. PATENT DOCUMENTS

| | | | | |
|---|---|---|---|---|
| 7,921,440 | B1* | 4/2011 | Kolde | H04N 21/4263 348/460 |
| 8,380,710 | B1* | 2/2013 | Finne | G06F 16/24578 707/723 |
| 8,678,930 | B2 | 3/2014 | Gabrail et al. | |
| 8,756,224 | B2* | 6/2014 | Dassa | G06F 16/24578 707/723 |
| 9,162,107 | B2 | 10/2015 | Aminzade | |

(Continued)

OTHER PUBLICATIONS

Larimer, Daniel et al., Steem, An Incentivized, Blockchain-based Social Media Platform, 2012, 44 pages.

(Continued)

*Primary Examiner* — Angelica Ruiz
(74) *Attorney, Agent, or Firm* — Brooks Kushman P.C.

(57) ABSTRACT

An incentivized electronic platform includes machine instructions when executed by the CPU that implement logic that includes transmission of a first digital register of first digital content items and a second digital register of second digital content items. The logic further includes reception of a digital user ranking based on user selection from the first and a second digital registers and including at least one charted digital content item and at least one of uncharted digital content item. The logic further includes calculation of a score associated with the digital user ranking over a period of time based on an activity tracking parameter of the first digital content items and the second digital content items on the digital user ranking within a predefined association of the user. The logic further includes transmission of an indication of the score associated with the digital user ranking.

21 Claims, 15 Drawing Sheets

(56) References Cited

U.S. PATENT DOCUMENTS

| | | | |
|---|---|---|---|
| 2006/0008256 A1* | 1/2006 | Khedouri | G06F 16/4387 386/234 |
| 2008/0032723 A1* | 2/2008 | Rosenberg | G06Q 50/10 455/466 |
| 2008/0215420 A1* | 9/2008 | Angelica | G06Q 30/02 705/300 |
| 2009/0063511 A1* | 3/2009 | Myers | G06F 3/04842 |
| 2009/0070331 A1* | 3/2009 | Silman | G06Q 30/00 |
| 2009/0277322 A1* | 11/2009 | Cai | G10H 1/0058 84/609 |
| 2009/0288118 A1* | 11/2009 | Chang | H04N 5/44543 725/46 |
| 2010/0169204 A1* | 7/2010 | Sippy | G06Q 40/00 705/35 |
| 2012/0011129 A1* | 1/2012 | van Zwol | G06F 16/951 707/748 |
| 2013/0073400 A1* | 3/2013 | Heath | G06Q 30/02 705/14.73 |
| 2013/0073473 A1* | 3/2013 | Heath | G06Q 30/02 705/319 |
| 2013/0191399 A1 | 7/2013 | Tocaben et al. | |
| 2013/0218862 A1* | 8/2013 | Ghosh | G06F 16/248 707/706 |
| 2013/0268963 A1* | 10/2013 | Nugent | H04N 21/435 725/32 |
| 2014/0136554 A1* | 5/2014 | Moradi | G06F 16/435 707/754 |
| 2014/0162741 A1 | 6/2014 | Diskin et al. | |
| 2014/0278986 A1* | 9/2014 | Rouse | G06F 16/9535 705/14.54 |
| 2016/0117063 A1* | 4/2016 | Fuller | G06F 3/04817 715/739 |
| 2016/0149956 A1* | 5/2016 | Birnbaum | H04L 63/101 726/1 |
| 2018/0018712 A1* | 1/2018 | Walden | H04L 67/146 |

OTHER PUBLICATIONS

Pfeiffer, Joseph, III et al., Incentivized Sharing in Social Networks, VLDB Workshop on Online Social Systems (WOSS), 2012, 6 pages.

McNew, Sarah, Incentivize Your Fans: A New Approach to Social Media Fans, http://MY.SOCIAL TOASTER.COM, Jun. 11, 2014, 3 pages.

https://fandistro.com/releasing/, A FanDistro Campaign Will Get Your Video Shared More, Apr. 5, 2017, 4 pages.

www/http://My.SocialToaster.com, How It Works, Learn How to Turn Your Fans into Superfans, 2017, 3 pages.

* cited by examiner

FIG. 15

INCENTIVIZED ELECTRONIC PLATFORM

TECHNICAL FIELD

This disclosure relates to an incentivized electronic platform.

BACKGROUND

Games may be used to improve socialization and activity among groups or associations. As groups and association sizes grow, technical solutions may be used to orchestrate gameplay and tally scores. Large-scale games may cause technical failures in game regulation infrastructure or impose large overhead costs. Technical improvements to game regulation and point systems may reduce such costs and processing requirements. Additionally, the use of these games on mobile devices may further restrict the processing power available to facilitate the games.

SUMMARY

A data structure is embodied on a computer-readable medium having a database schema for accessing and managing incentivized electronic platform data in a structured query language (SQL) database. The data schema includes a digital user ranking schema for relating a selected digital user ranking of a plurality of users including first digital content items and second digital content items. The data schema further includes an incentive results schema representing relational data tables for capturing a plurality of incentivized promotions associated with the users including a score accumulated from the digital user ranking over a period of time based on an activity tracking parameter of the first and second digital content items. Further, the digital user ranking schema and the incentive results schema are used by an incentivized electronic platform application to access and manage promoted digital content items in the SQL database.

An incentivized electronic platform includes machine instructions when executed by the CPU that implement logic that includes transmission of a first digital register of first digital content items and a second digital register of second digital content items. The logic further includes reception of a digital user ranking based on user selection from the first and a second digital registers and including at least one first digital content item and at least one of second digital content item. The logic further includes calculation of a score associated with the digital user ranking over a period of time based on an activity tracking parameter of the first digital content items and the second digital content items on the digital user ranking within a predefined association of the user. The logic further includes transmission of an indication of the score associated with the digital user ranking.

An incentivized electronic platform includes machine instructions when executed by the CPU that implement logic including transmission of a digital register of digital content items. The logic further includes reception of a digital user ranking based on user selection from the digital register including at least one digital content item. The logic further includes calculation of a score associated with the digital user ranking over a period of time based on an activity tracking parameter of the digital content item on the digital user ranking relative to a predefined association of the user defined by a predominant location of the user aggregated over a location assessment period received from a positioning system transceiver of digital interaction devices that are assigned to predefined associations. The logic further includes transmission of an indication of the score associated with the digital user ranking.

BRIEF DESCRIPTION OF THE DRAWINGS

FIG. 15 is a display screen of a GUI including a digital content item creator dashboard.

DETAILED DESCRIPTION

Figure 1:
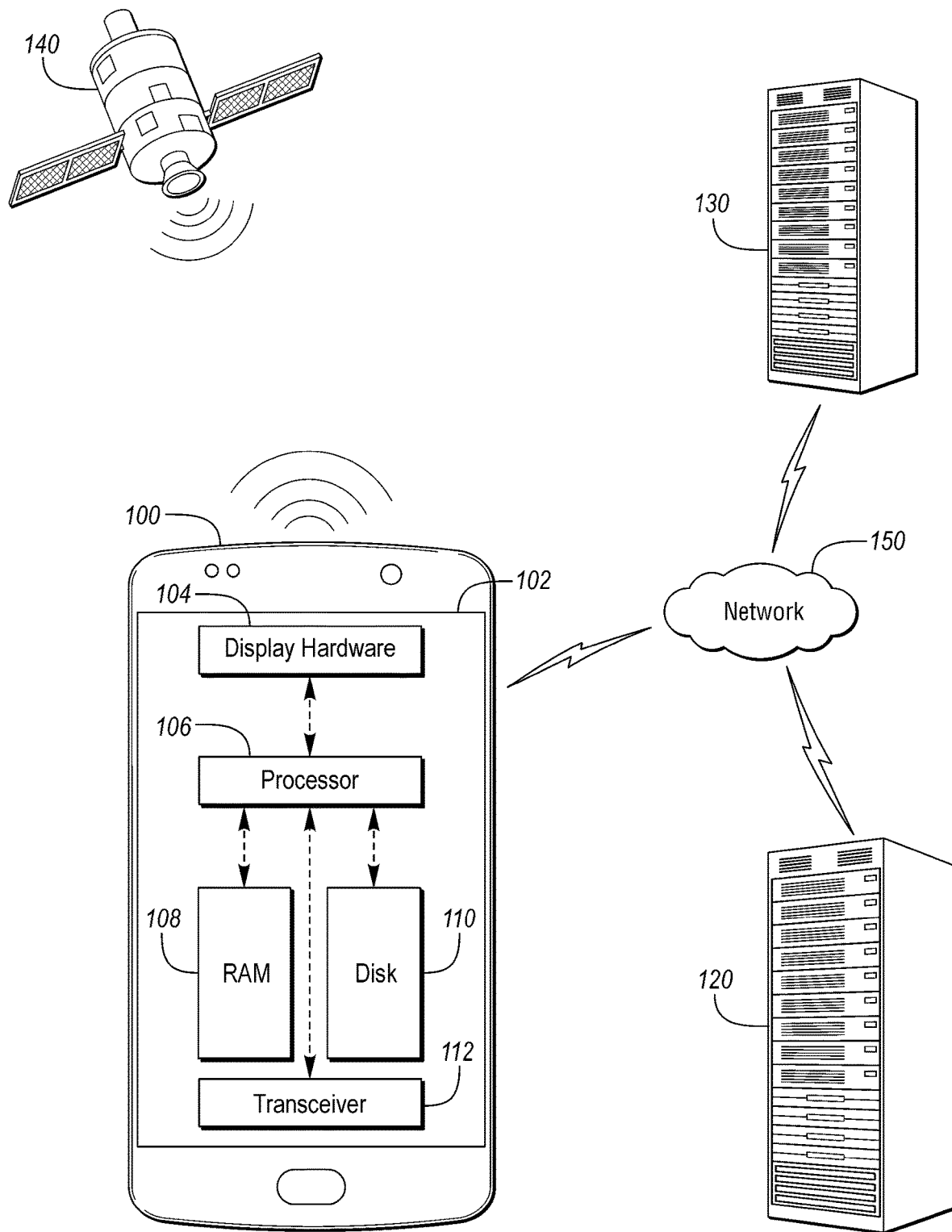
FIG. 1 is a computer system for improving the organization and point retention for an electronic game.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Processing and memory constraints necessitate efficient gaming platforms, architectures, and data schemas to allow interoperability with mobile devices. The existing computer game systems and point accumulators do not provide adequate technical solutions that provide efficient gaming platforms, architectures and data schemas. Mobile devices may have limited processing capabilities, memory availability, and data transmission capabilities. Movement from high-performance gaming rigs to mobile devices has increased the gravity of deficient data structures and communication methods.

The following proposed gaming systems have failed to provide adequate technical solutions to these acute problems.

U.S. Pat. No. 8,678,930, to Gabrail, discloses a fantasy league management system including one or more reality factors, equity lines, luxury taxes, or revenue sharing policies. The fantasy league management system discloses generic databases for storing and maintaining data. Gabrail, however, does not attempt to technically improve the association of data within the system or improve data structures and components necessary for fantasy league management. Gabrail attempts to apply computer methods to a well-known fantasy league practice, instead of a technical improvement to computers processing fantasy league parameters.

U.S. Pub. No. 2013/0191399A1, to Tacoben, discloses an inadequate content distribution system. The Tacoben system and method provides a generic "rotational database" structure. The Tacoben system does not provide technical improvement data structures to reduce processing, transmission, and memory usage of mobile devices and backend servers. Tacoben does not provide an improvement to computer functionality itself such as improving data structures required to maintain and process digital content.

U.S. Pub. No 2014/0162741A1, to Diskin, discloses a non-technical improvement to a fantasy league system for allocating points to a fantasy team. Diskin fails to address technical aspects necessary to improve the digital computer system. The fantasy league system of Diskin does not address specific data structures necessary to meet mobile device constraints.

On the other hand, the incentivized electronic platform, the computer system, the computer-readable medium, and the database signature components and parts described herein provide a non-abstract, technological improvement over the previous methods. These technological improvements are rooted in an incentivized data structure having a digital user ranking schema, and an incentivized results schema. The digital user ranking schema and the incentivized results schema are used by an incentivized electronic platform approach to access and manage provided digital content items in a SQL database.

According to one embodiment, a data structure embodied on a computer-readable medium may include a database schema for accessing and managing incentivized electronic platform data. Data stored in the schema may include digital content items or referential information to the digital content items. Each of the digital content items may be identified by a unique identifier. The unique identifier may be assigned to each digital content item using a hash mechanism (e.g., MD5). The unique identifier may also include a first portion to identify an original work and a second portion to identify a derivative work. The unique identifier may be used to organize the schema.

The schema may also include ranking information. The ranking information may be used to generate digital registers, including a subset of digital content items based on popularity or association. The schema is an innovative logical model for maintaining game data and information. An additional digital register may include a subset of unranked digital content items. The schema may include a column or identifier for recognizing unranked digital content items (e.g., null).

The ranked and unranked digital registers may be sent to a user through a network (e.g., internet) for selection such that the user can participate in a game. The user may select from the digital registers to form a digital user ranking. The digital user ranking may include digital content items from both registers. After the digital user ranking is determined, it is compared against other digital user rankings. The comparison uses activity tracking parameters to determine points associated with each digital user ranking. For example, an activity tracking parameter may be the popularity of the digital content item. If the digital content item is a song, points may be assigned to the digital user ranking based on the improvement of the song along the charts.

Referring to FIG. 1, a mobile device 100 is shown. The mobile device 100 may include a display 102. The display 102 may be an LCD, OLED or another implement. The display 102 may be driven by display hardware 104, which may include processors or drivers for illuminating the display 102. The display hardware 104 may be connected to a processor or processors 106. The processors 106 are associated with memory 108 and storage 110. The mobile device 100 may also include a transceiver 112 connected to the processor 106 for sending and receiving digital register data, digital user rankings, game information, game scores, and other information required by the game. For example, the game may have a location or region component to localize players such that players compete against similarly situated contestants. The localization component may use GPS 140 or cellular towers to locate and track the mobile device 100 over time. The device 100 may be associated with other nearby devices to form competitive groups. The players may be otherwise associated. For example, the players may be associated by school, fraternity, or sports teams.

The mobile device 100 may be configured to transmit and receive data through the internet 150. The internet 150 may be reached through cellular towers, satellite or ad-hoc networks. The mobile device 100 may be connected with a backend server 120. The backend server 120 may serve as the main repository for data and information associated with the game. The backend server 120 may include a data store and processing components to store digital content items and references, calculate scores associated with digital user rankings, track activity parameters to determine the score, and otherwise facilitate the game. The backend server 120 and mobile device 100 may be connected with a third-party fingerprinting server 130. The third-party fingerprinting server 130 may determine the unique identifiers associated with original digital content items and derivative digital content items. It should be appreciated that any combination of servers 120, 130 and mobile devices 100 may facilitate the game. For example, the game may be operated entirely on one device 100.

Figure 2:
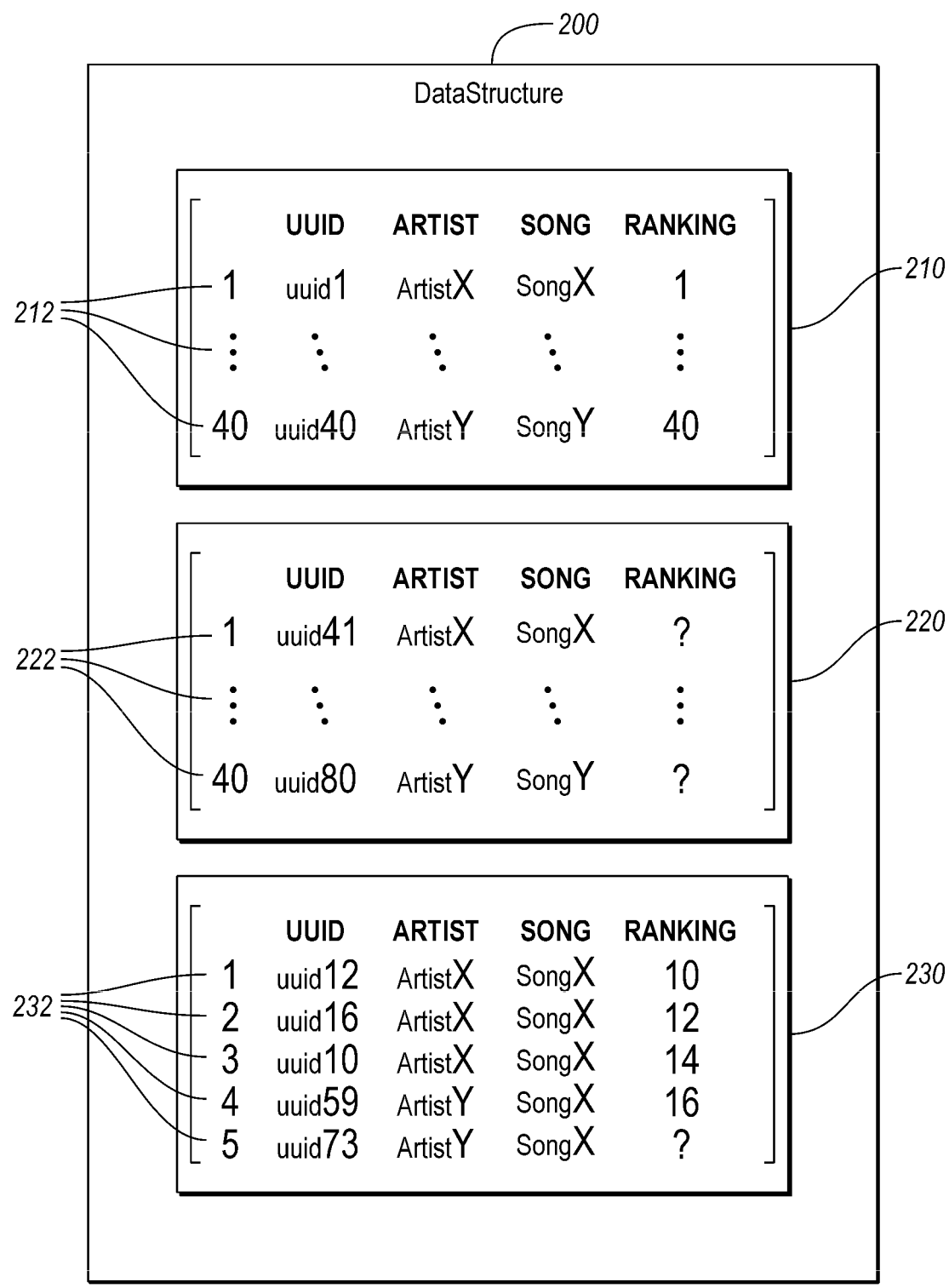
FIG. 2 is a data schema for storing a first or second digital register and a digital user ranking.

Referring to FIG. 2, a portion of a data structure 200 is shown. The data structure includes an efficient storage mechanism for storing digital user rankings 230 and digital registers 210, 220 of digital content items 212, 222, 232. The digital content items 212, 222 may be assigned to rows each having a unique identifier and other digital content item 212, 222 information. The ranked digital register 210 may include a variety of ranked digital content items 212 taken from a digital content repository. The repository may be located on the third-party fingerprinting service server 130. The digital content repository may be located on the data store of the backend server 120. The ranked digital register 210 may look like schema 1, below.

$$\begin{bmatrix} & UUID & ARTIST & SONG & RANKING \\ 1 & uuid1 & ArtistX & SongX & 1 \\ \vdots & \ddots & \ddots & \ddots & \vdots \\ 40 & uuid40 & ArtistY & SongY & 40 \end{bmatrix} \quad (1)$$

In order to sort the ranked digital register 210, the items may be bucket sorted, bubble sorted, insertion sorted, selection sorted, heap sorted, or most preferably merge sorted. The digital content items 212 may be arranged for selection by the user of the mobile device 100. The digital content items 212 may be arranged in the digital register 210 in a variety of ways. The digital content items 212 may be ranked according to popularity. The popularity index may be localized to the region or association of the user of the mobile device 100. For example, the ranked digital register 210 may be formed based on the local popularity of the digital content item 212. The digital content item 212 may be a song, book, movie, streamed media, music video, or other created content available in a digital form. The ranking may also take into consideration hardcopy or paper forms of the digital content items. The popularity index may incorporate or consist of a public popularity index (e.g., Nielsen®).

The data structure 200 may include an unranked digital register 220. The unranked digital register 220 may include unranked digital content items 222. The unranked digital content items may be selected from a variety of sources. The unranked digital content item 222 may be associated with the user of the mobile device 100. The unranked digital content item 222 may be promoted by a local radio station or part of an association related to the user of the mobile device 100. The unranked digital register 220 may be similar to schema 2, as shown below. As shown, the unranked digital content items 220 have different unique identifiers (UUIDs) than the ranked digital content items. The digital content items 212, 222 of the ranked and unranked digital registers 210, 220 may have little or no intersection.

$$\begin{bmatrix} & UUID & ARTIST & SONG & RANKING \\ 1 & uuid41 & ArtistX & SongX & ? \\ \vdots & \ddots & \ddots & \ddots & \vdots \\ 40 & uuid80 & ArtistY & SongY & ? \end{bmatrix} \quad (2)$$

The data structure 200 may include a digital user ranking 230 including selected digital content items 232. The selected digital content items 232 may be selected from at least one of the ranked and unranked digital registers 210, 220. The selected digital content items 232 may be tracked to determine the top score of the players in the game. The digital user ranking 230 or a portion thereof may be sent to the backend server 120. For example, the UUIDs associated with the selected digital content items 232 may be sent to the backend server. In another embodiment, activity tracking data associated with selected digital content items 232 may be sent to the mobile device 100 for tabulation thereby reducing the processing and memory required to obtain a score. The digital user ranking may be similar to schema 3, as shown below. Portions of the data structure 200 may be located on the backend server 120, mobile device 100, or third-party server 130.

$$\begin{bmatrix} & UUID & ARTIST & SONG & RANKING \\ 1 & uuid12 & ArtistX & SongX & 10 \\ 2 & uuid16 & ArtistX & SongY & 12 \\ 3 & uuid10 & ArtistX & SongZ & 14 \\ 4 & uuid59 & ArtistY & SongX & 16 \\ 5 & uuid73 & ArtistY & SongY & ? \end{bmatrix} \quad (3)$$

The data structure 200 may further include an activity tracking schema to track activity associated with each digital content item UUID. The activity tracking schema may include competition starting date ranking and accumulators for each of the activity tracking genres and each of the digital user rankings 230. For example, the activity tracking schema may include a column for tracking the promotions a user has made for each selected digital content item 232 on the digital user ranking 230.

The data structure 200 may further include demographic tracking information related to the user, contest, association, digital content creator, digital content items, or other information of interest. The data structure 200 may track what associations are promoting a digital content item or determine song preferences of a user.

Figure 3:
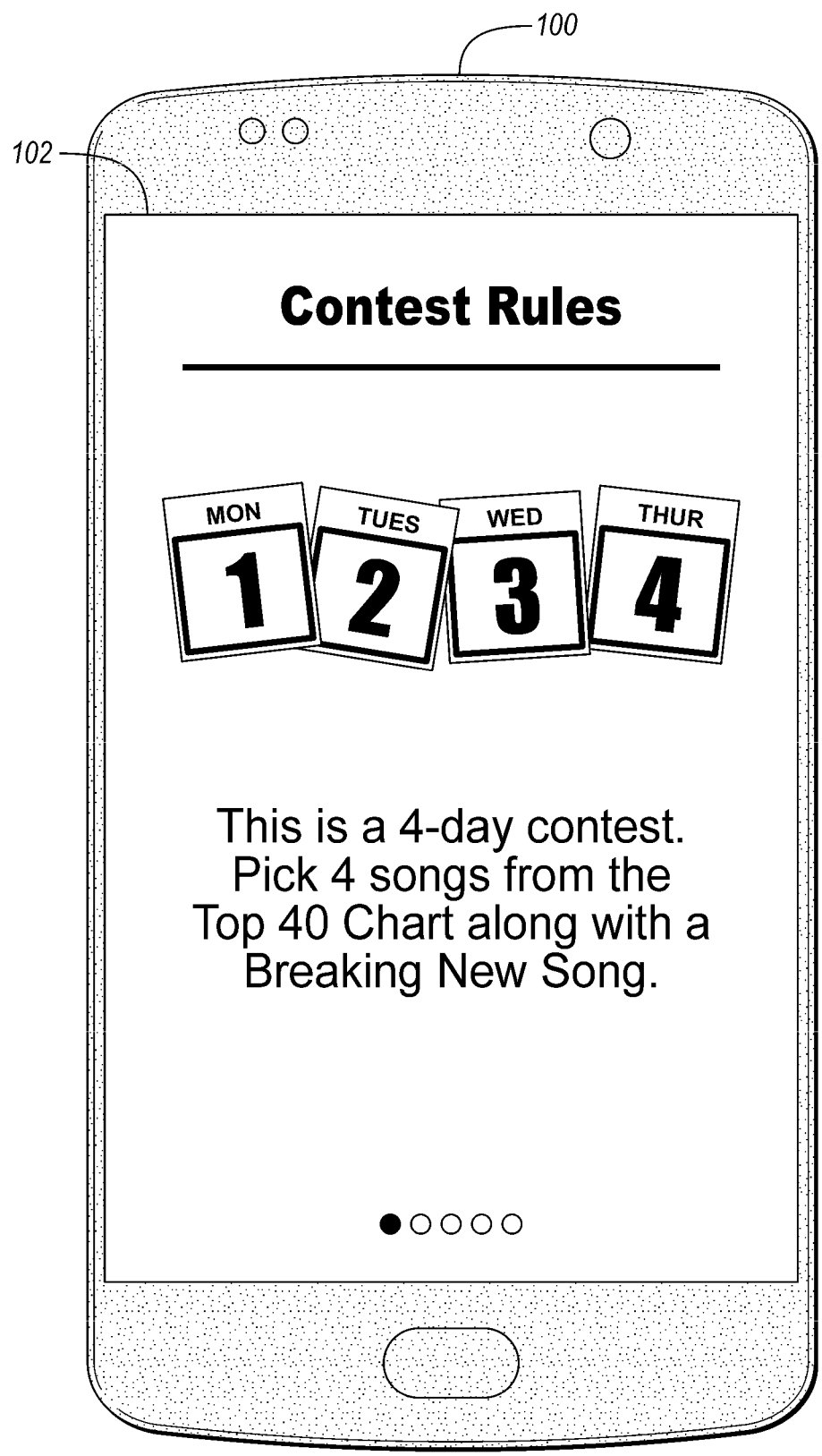
FIG. 3 is a computer graphical user interface (GUI) for a game having a four-day contest.

Referring to FIG. 3, a computer graphical user-interface (GUI) for the game is shown. The splash screen is displayed on the GUI 102 of the mobile device 100. The splash screen may define the game to be played. The game to be played may be a four-day contest organized by a radio station. The contest may include a selection of four ranked digital content items 212 from the ranked digital content register 210 and one unranked digital content item 222 from the unranked digital content register 220. The contest may be any length of time or be based on other factors (e.g., point total accumulation). The contest may vary by location and contest.

Figure 4:
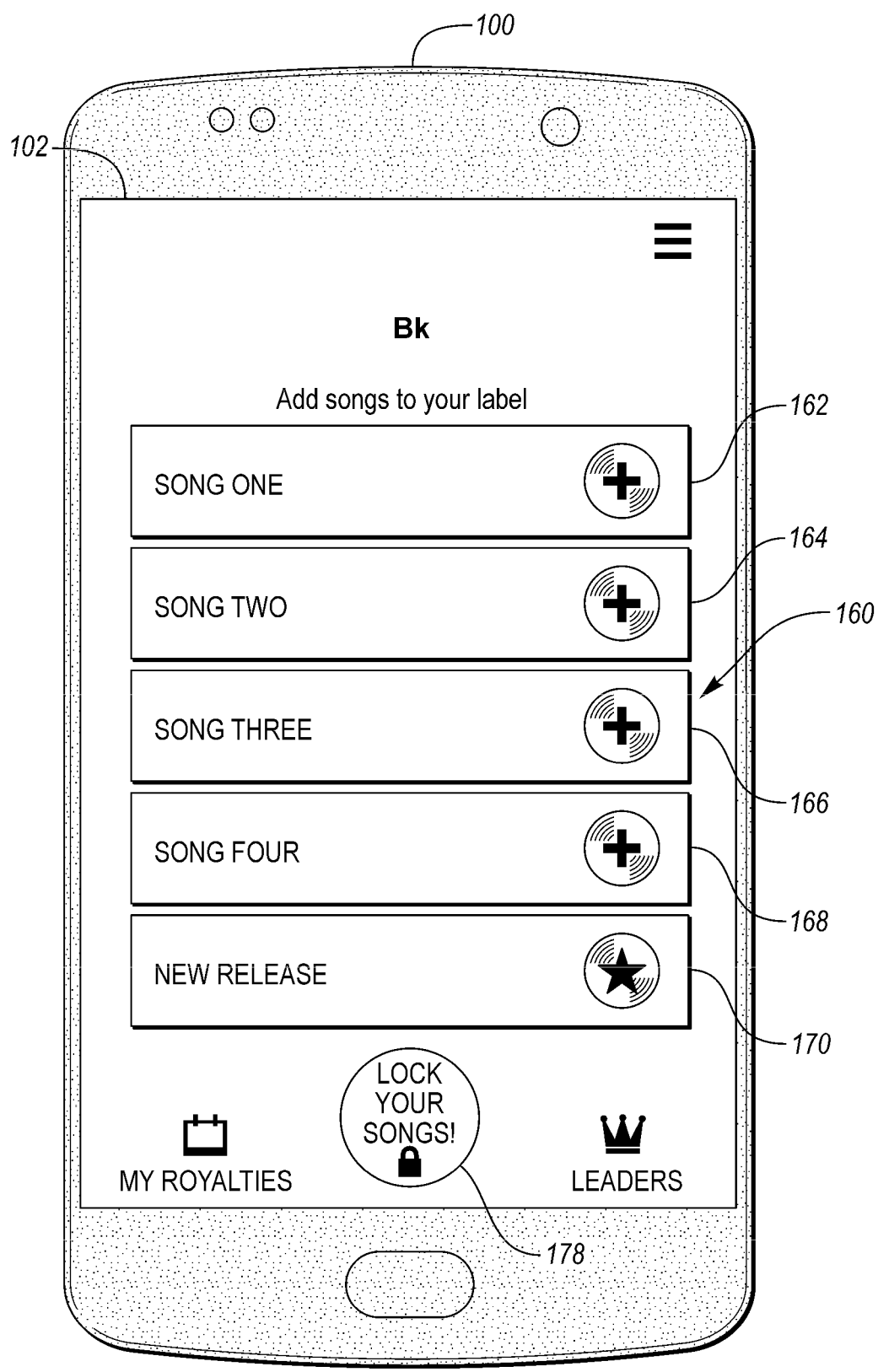
FIG. 4 is a GUI including a selection screen for a digital user ranking of a digital register.
Figure 5:
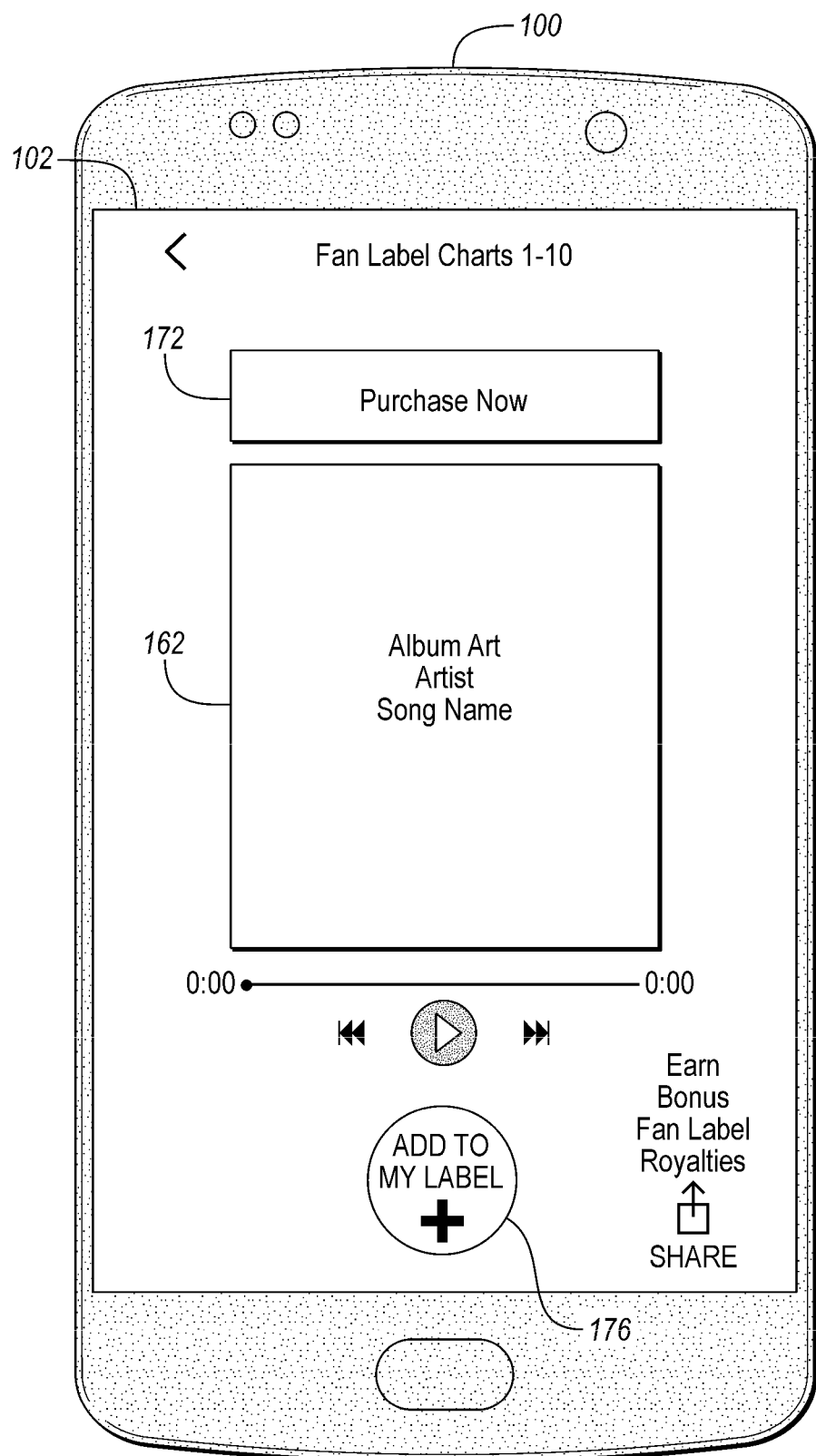
FIG. 5 is a GUI including a selection screen of a digital content item from a digital register.
Figure 6:
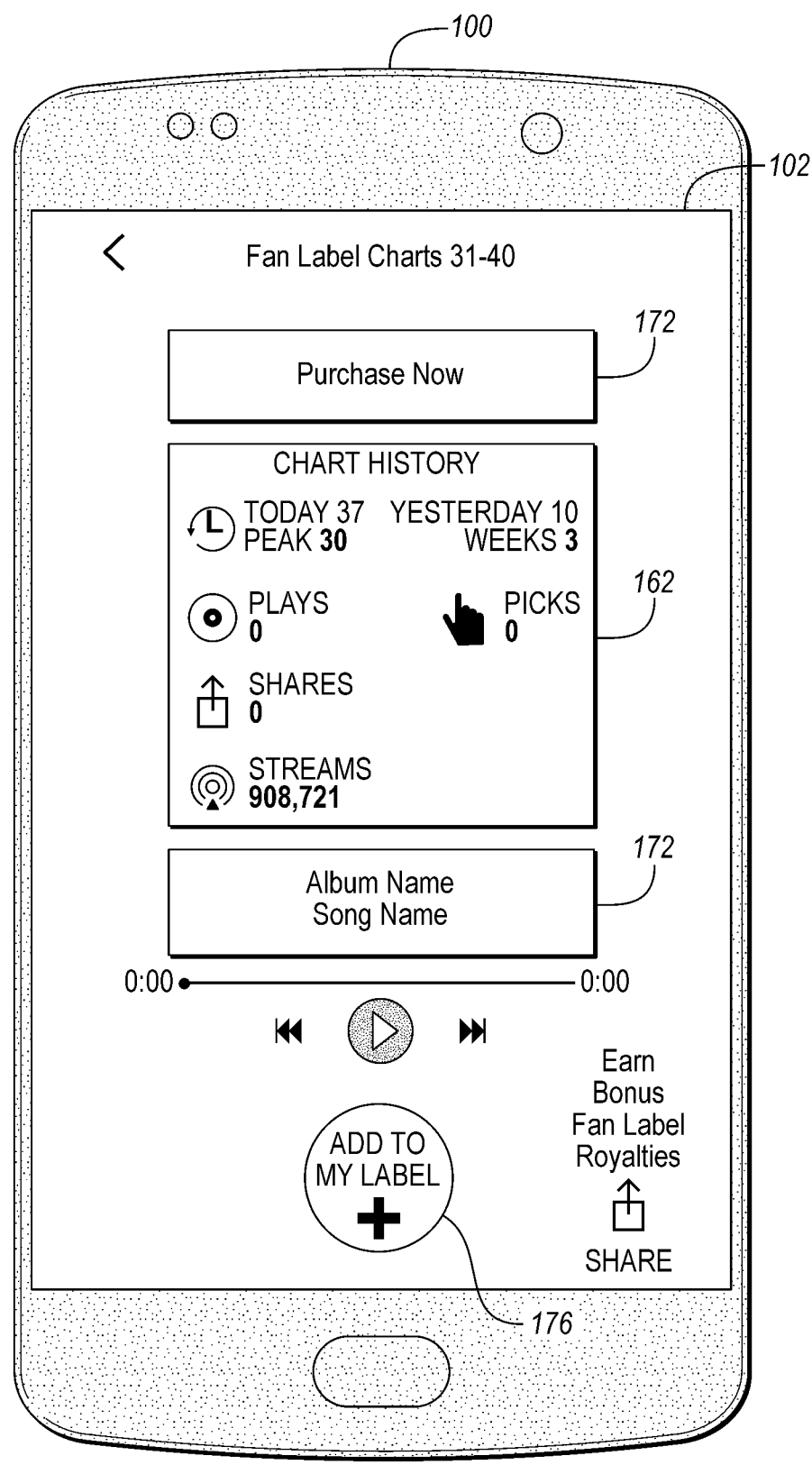
FIG. 6 is a GUI including a selection screen of a digital content item from a digital register.
Figure 7:
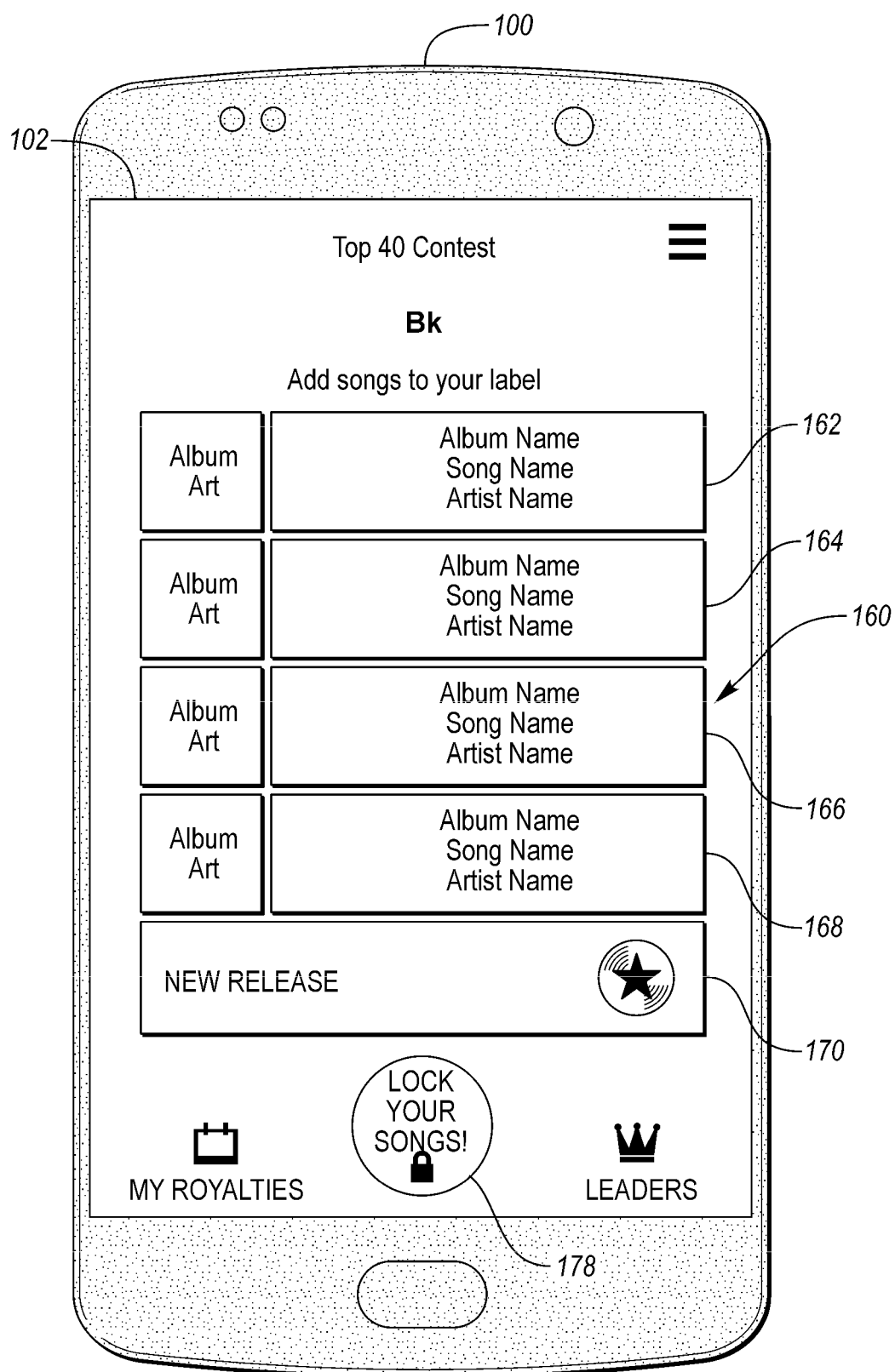
FIG. 7 is a GUI of a digital user ranking for a game.
Figure 8:
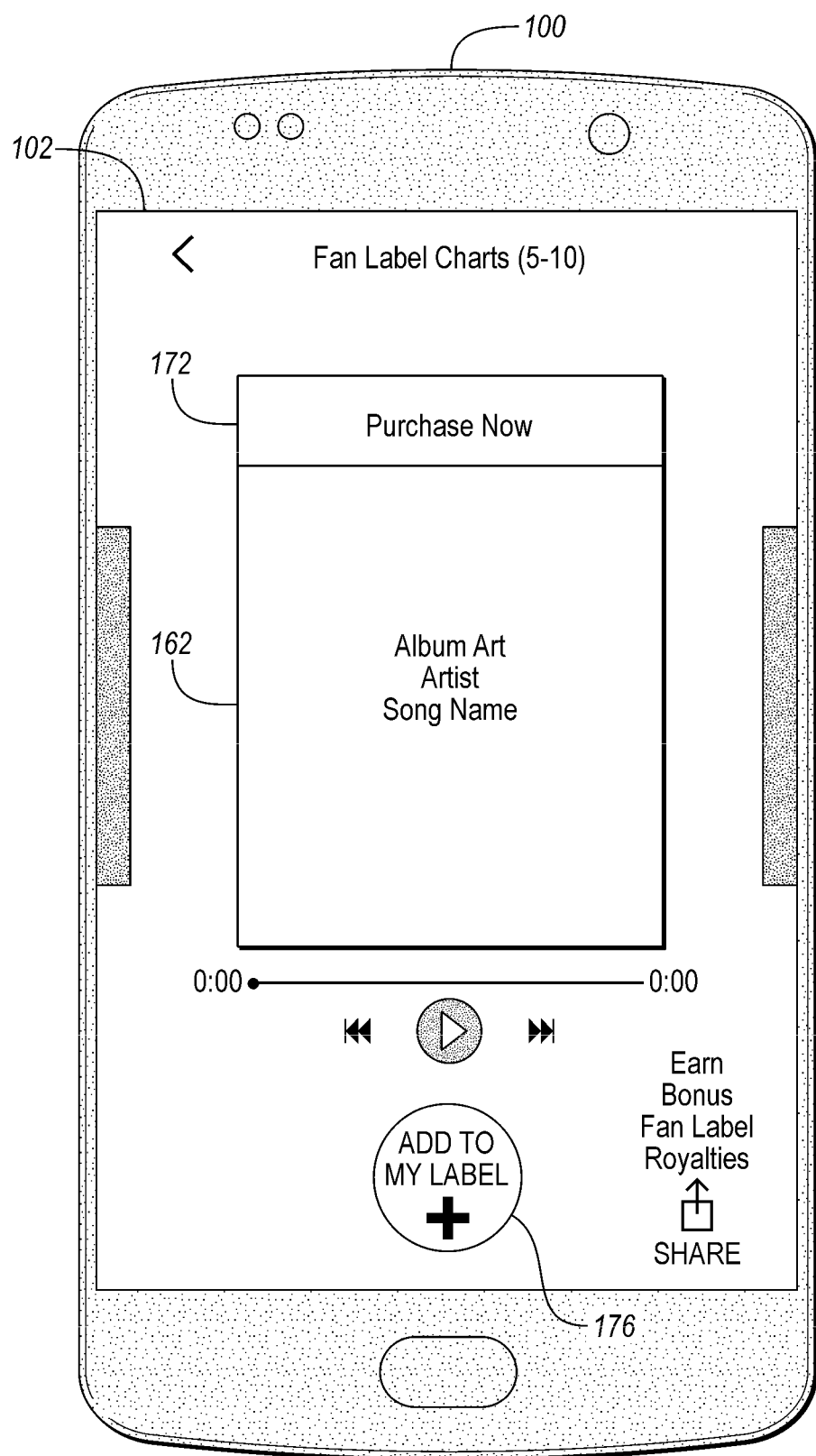
FIG. 8 is a GUI display of an uncharted digital content item of an uncharted digital register.

Referring to FIG. 4, a mobile device 100 having a GUI 102 is shown. The GUI includes a digital content item selection screen 160 of a software application. The digital content selection screen 160 includes a number of selection prompts 162, 164, 166, 168, 170 operable to enable a user to select from a ranked digital content register 210 and an unranked digital content register 220. The score may be viewed by the "my royalties" button. The overall game score may be viewed with the "leaders" button. The user may select the digital content items 212, 222 and proceed to "lock" 178 a selection before the game is started.

Figure 9:
FIG. 9 is a GUI including a selection lock screen and game timer countdown screen.

Referring to FIGS. 5-8, GUIs of the ranked digital register 210 and unranked digital register 220 are shown. The mobile device 100 includes a GUI 102. The GUI 102 includes scrollable prompts 162, 164, 166, 168, 170 for selecting a ranked digital content item 212 and an unranked digital content item 222. Additional information related to the digital content item 212 is selectively shown through button 162. The user is also prompted to purchase a digital content item with button 172. Button 176 allows the user to add the ranked digital content items 212, 222 to the selection. After the digital content items 212, 220 are selected, the user may use button 178 to select in the digital content items 212, 222, which adds the items 212, 222 to the digital user ranking 230. Referring to FIG. 9, a splash screen is shown on the GUI 102 of the mobile device 100. The splash screen indicates the time remaining in the contest 180 and a confirmation button 182.

Figure 10:
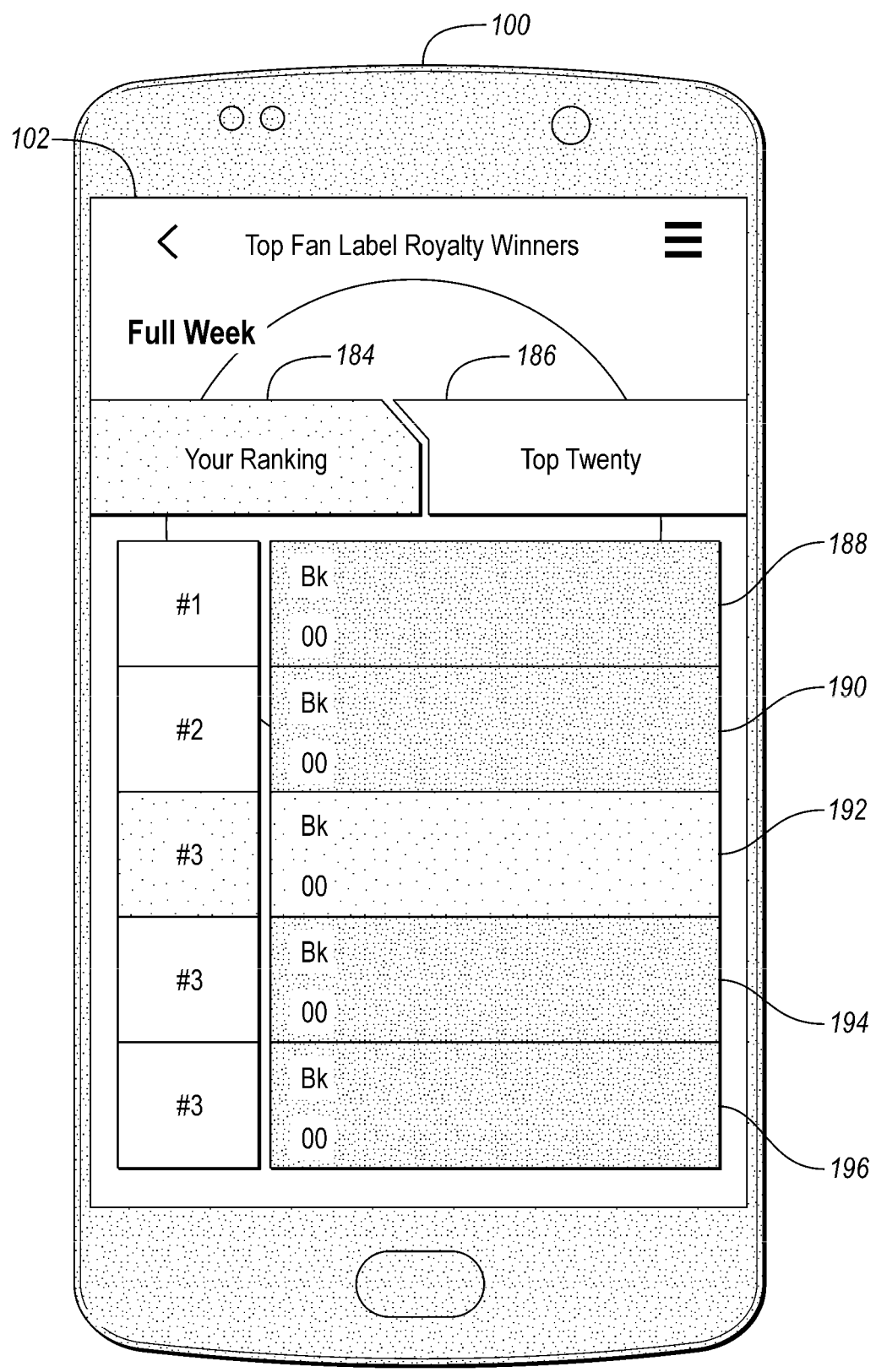
FIG. 10 is a GUI including a scoreboard of a digital user ranking.

Referring to FIG. 10 a list of points 188, 190, 192, 194, 196 associated with digital user rankings 230 is shown on the GUI 102 of the mobile device 100. The contest may have numerous digital user rankings 230 from various participants, as shown through each of the point accumulators 188, 190, 192, 194, 196 related to each of the digital user rankings 230. The list is sorted such that the digital user ranking 230 having the highest number of accumulated points 188, 190, 192, 194, 196 is shown. The points are accumulated through activity tracking. The user may select to display a personal ranking 184 or the top twenty digital user rankings 230 through button 186. In some embodiments, the scores 188, 190, 192, 194, 196 may be shown as ticker tape across a top or bottom portion of the GUI 102.

Figure 11:
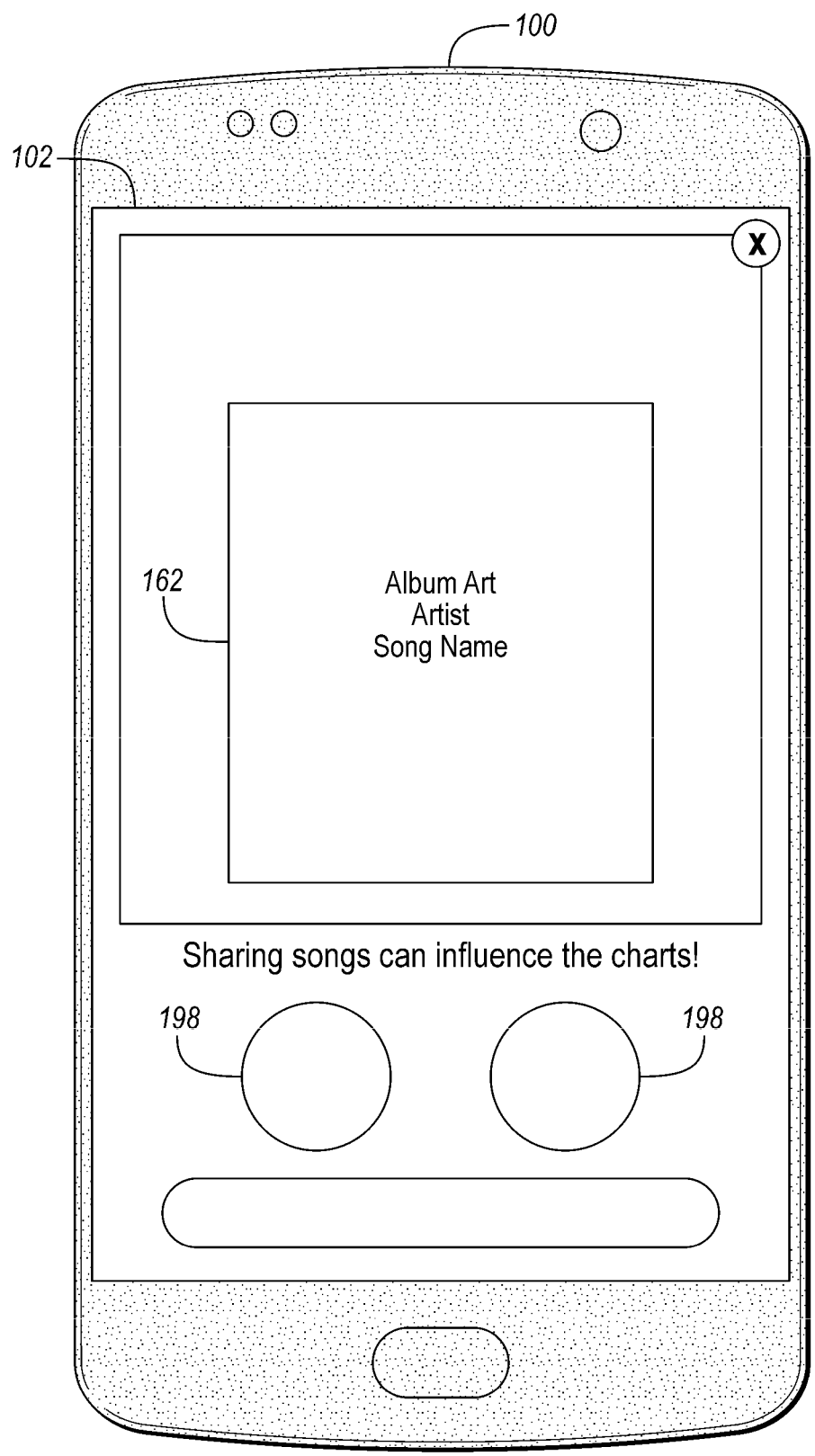
FIG. 11 is a GUI including a promotion screen of a digital content item associated with a digital user ranking.

Referring to FIG. 11, the user may promote or share a selected digital content item 232 associated with the digital user ranking 230 through a similar interface on the GUI 102 of the mobile device 100. A prompt 162 including information associated with the selected digital content item 232. The user is then prompted to promote the selected digital content item 232 through buttons 198 connecting the content to a network. Promotion may be considered an activity tracking parameter that increases a score 188, 190, 192, 194, 196 associated with the user's digital user ranking 230.

Figure 12:
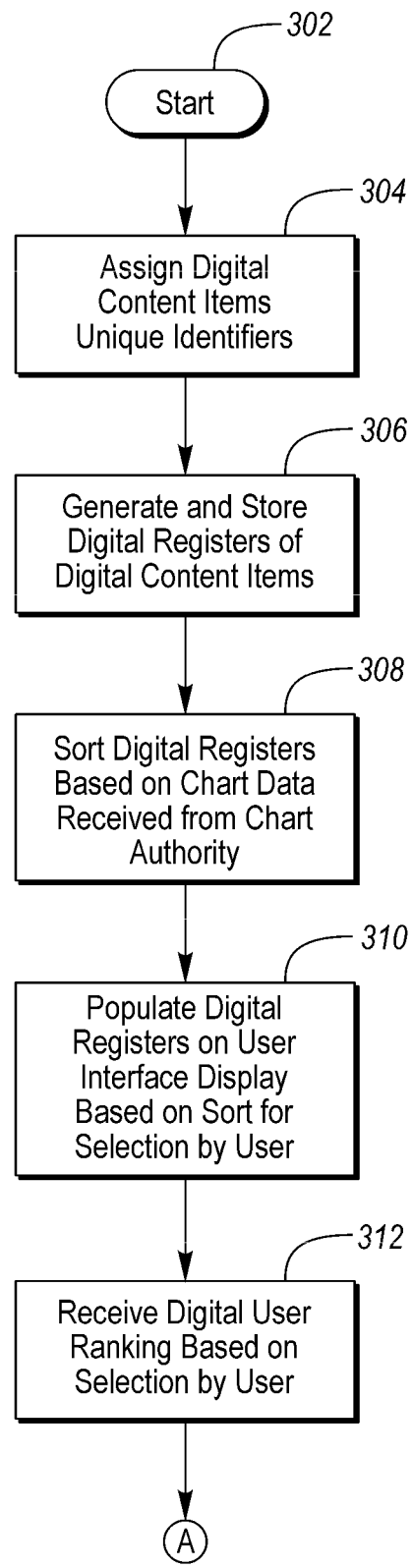
FIG. 12 is a portion of a flow diagram for an improved game scoring computer system.
Figure 13:
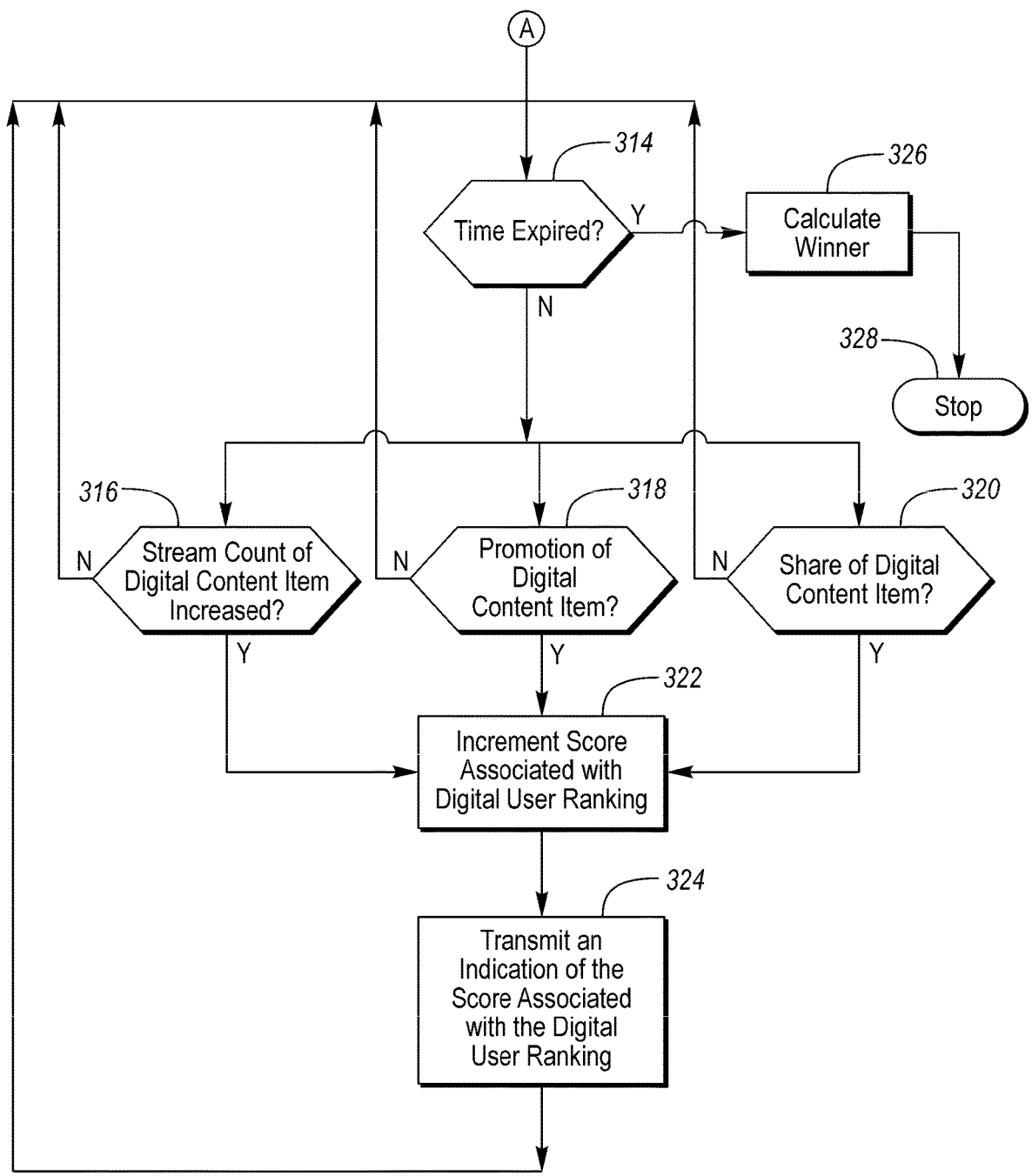
FIG. 13 is a portion of a flow diagram for an improved game scoring computer system.

Referring to FIGS. 12 and 13, a flow diagram 300 of a game is shown. In step 302 the algorithm begins. In step 304, the digital content items 212, 222 are assigned unique identifiers. The unit identifiers may be assigned through a hashing algorithm (e.g., MD5) to uniquely identify each digital content item 212, 222 for selection. The unique identifier may include a portion to signify an original or derivative work.

In step 306, the ranked and unranked digital registers 210, 220 are generated and stored. The ranked digital register 210 is generated based on popularity or other factors. Nielsen® charts and chart positions may be used. The chart position or ranking may indicate a statistical approval rating of the digital content item 232. The chart position or ranking may be defined at a national, state, or local level. Local popularity indexes based on streams in particular regions or associations may be used. For example, the streams belonging to a particular university may be aggregated and assigned to a ranking. The unranked digital register 220 may be generated based on the user or other factors. For instance, the unranked digital register 220 may be created by a local radio station or a college club.

In step 308 the digital registers are sorted and stored by the ranking. The sorting may be performed using various methods. For instance, a merge sort may be used to streamline the sorting process at the mobile device 100. In step 310, the digital registers 210, 220 are populated on the mobile device GUI 102. In step 312, the user selects the digital user ranking 230 by identifying ranked and unranked digital content items 212, 222.

In step 314, the mobile device 100 or backend server 120 determines whether the contest timer has expired. If the timer has not expired an activity tracking algorithm is initiated to determine total points assigned to each selected digital content item 232 selected in the digital user ranking 230. For example, a score associated with the selected digital content item 232 of the digital user ranking is incremented, in step 322, if the stream count of the selected digital content item 232 has increased, in step 316. Periodic polling of streaming services may be performed to determine the number of streams of the selected digital content item 232. In step 318, if the user has promoted the digital content item 318, the score associated with the digital user ranking is increased in step 322. In step 320, if the user has shared the digital content item, the score associated with the digital user ranking is increased in step 322. For example, the user may use a peer-based sharing service to share the selected digital content item 232 with friends on social media. In step 324, an indication of the score associated with the digital user ranking is transmitted or displayed on the mobile device 100.

The score associated with the digital user ranking may also include a risk factor. The risk factor may proportionately or unproportionately change the points assigned to each score based on a likelihood of success of the digital content item 212, 222 selection. The risk associated with each digital content item 212, 222 may be displayed next to the item 212, 222 during the selection process. The risk may be based on a trend of the digital content items 212, 222 popularity. For example, a song that is losing popularity may be associated with a higher risk, providing greater reward to the user who includes the song in their digital user ranking 230.

If the contest time has expired, in step 314, the backend server 120 or mobile device 100 will calculate a total score of each of the digital user rankings in the contest. The highest score is then submitted as the winner. In step 328 the game is stopped.

Figure 14:
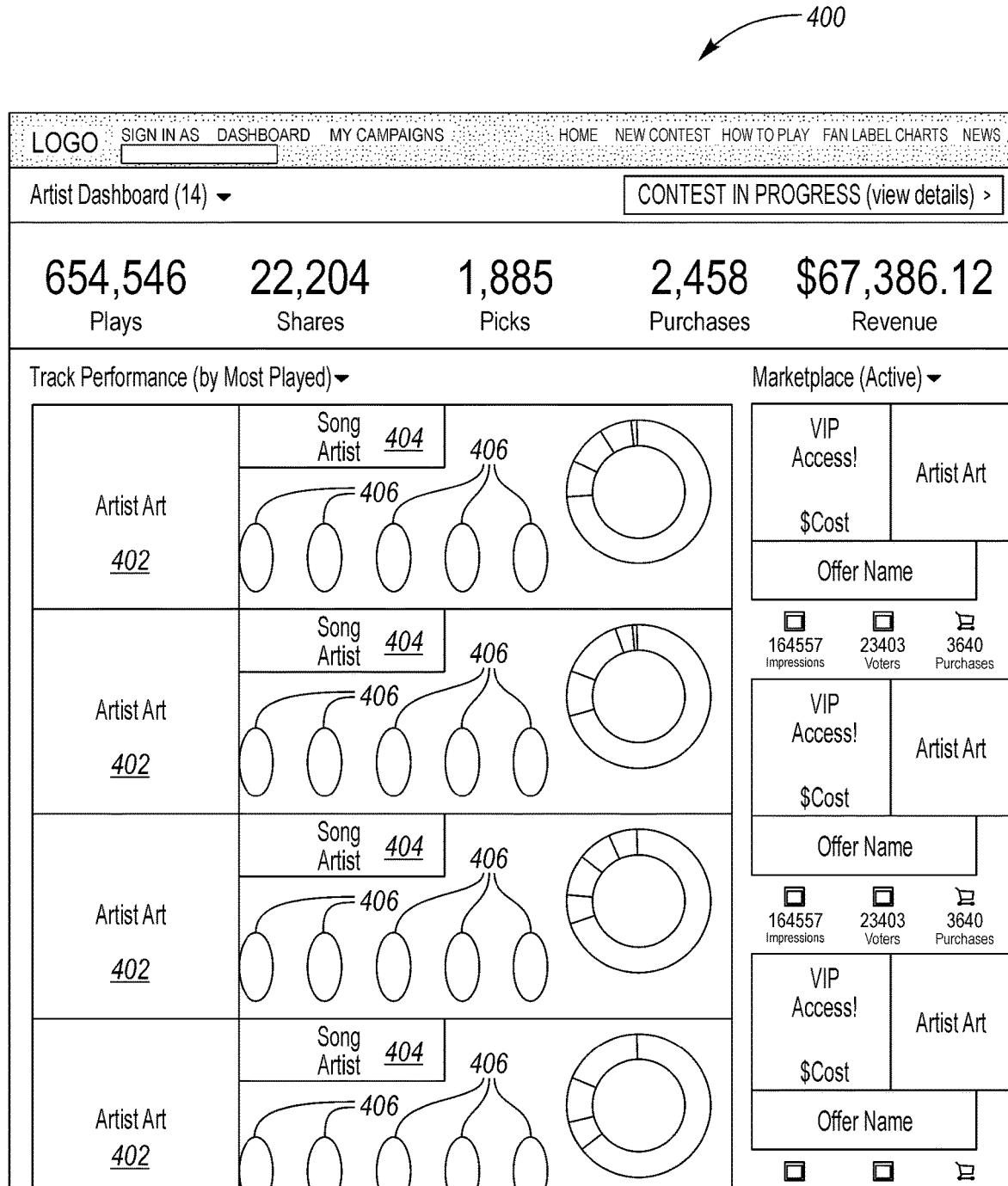
FIG. 14 is a display screen of a GUI including a digital content item creator marketplace.
Figure 15:
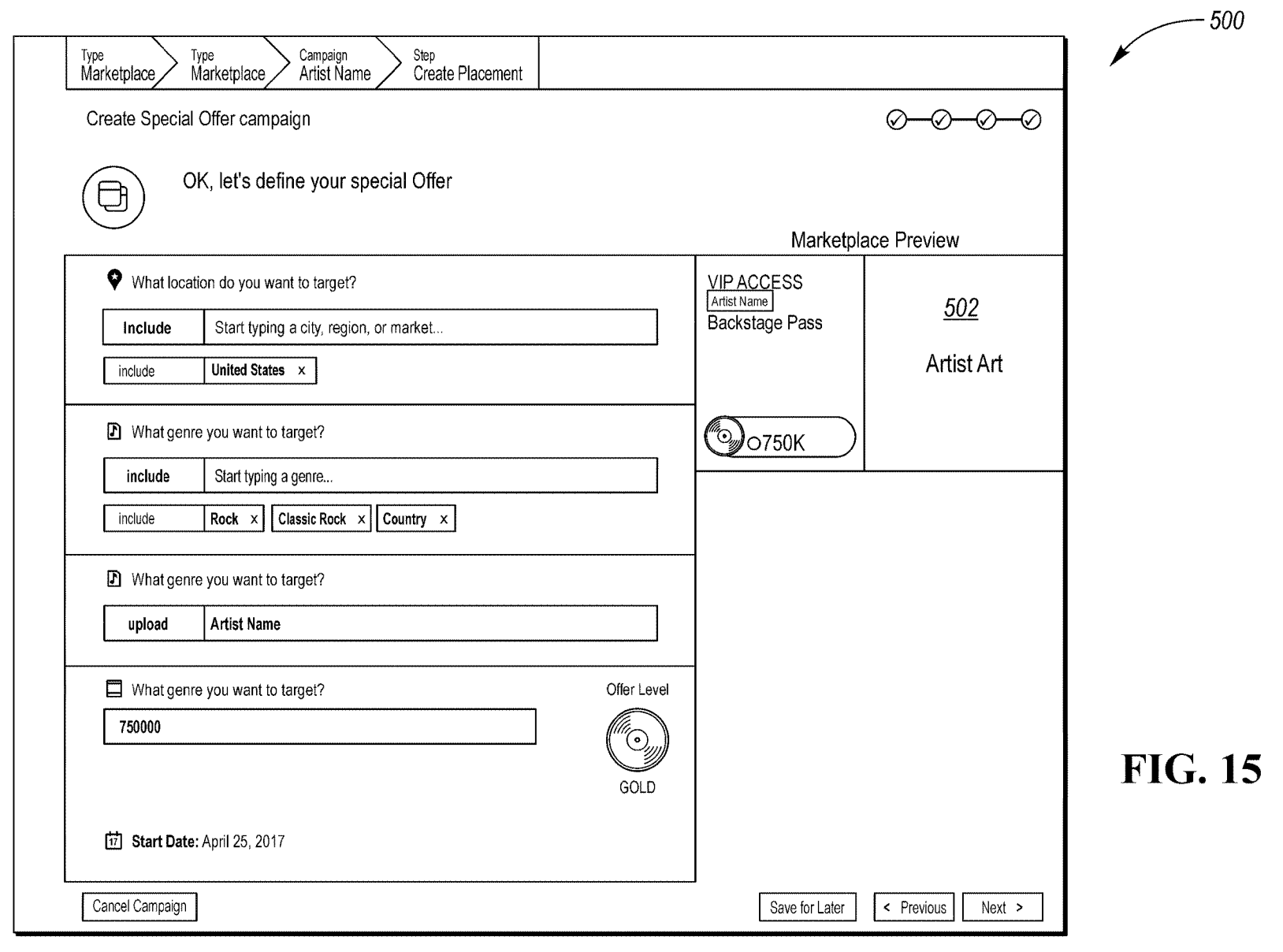

Referring to FIGS. 14 and 15, GUIs 400, 500 for a marketplace of an incentivized electronic platform is shown. The marketplace includes a dashboard that highlights a digital content creator's activity tracking parameters and other information over time. The dashboard may include information related to particular contests, including rewards, promotions, purchases, impressions, views, shares, contests, and other information. The dashboard may include information related to each of a digital content creator's songs. The dashboard may allow a digital content creator to target particular locations, associations, musical genres, or other contest relevant parameters. The digital content creator may award offerings (e.g., backstage passes, digital content items) to any participant that reaches activity tracking parameter points associated with the particular digital content creator above a predetermined threshold. For instance, a music artist may give a backstage pass to any contestant that reaches a score of 750,000 activity tracking points related specifically to that music artist. The contestant may select that artist's songs, promote those songs, share those songs on social media or use other methods to obtain points related to that artist.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A data structure embodied on a computer-readable medium having a database schema for accessing and managing incentivized electronic platform data in a structured query language (SQL) database, the database schema comprising:
   a digital user ranking schema for relating a plurality of selected digital user rankings based on user selection of digital content items by a plurality of users, the digital content items being songs having song names and/or artists and including uncharted digital content items having song names and/or artists but without statistical approval ratings or chart positions at a national level, one or more of the uncharted digital content items is part of an association with one of the plurality of users; and
   an incentive results schema representing relational data tables for capturing a plurality of incentivized promotions associated with the users including a score accumulated for each of the plurality of selected digital user rankings over a period of time based on an activity tracking parameter of the digital content items, the activity tracking parameter being a stream count from a commercial streaming data provider,
   the digital user ranking schema and the incentive results schema used by an incentivized electronic platform application to access and manage promoted digital content items in the SQL database.

2. An incentivized electronic platform comprising:
   at least one processor including a computer having a central processing unit (CPU) for executing machine instructions and a memory for storing machine instructions that are to be executed by the CPU, the machine instructions when executed by the CPU implement the following logic:
      transmit, to each of a plurality user transceivers, an uncharted digital register of uncharted digital content items, the uncharted digital content items being songs having song names and/or artists but without statistical approval ratings or chart positions at a national level, one or more of the uncharted digital content items is part of an association with a user;
      receive, from each of the plurality user transceivers, a digital user ranking based on a user selection from the digital register by the user and including at least one of the uncharted digital content items;
      calculate, for each of the plurality of user transceivers, a score associated with the digital user ranking over a period of time based on a first activity tracking parameter of the uncharted digital content items on the digital user ranking within a predefined association of the user, the activity tracking parameter being a stream count from a commercial streaming data provider; and
      transmit, to each of the plurality of user transceivers, an indication of the score associated with the digital user ranking wherein the score calculated and transmitted to each of the plurality of user transceivers is not the same.

3. The incentivized electronic platform of claim 2, wherein the score is based on a second activity tracking parameter that is a promotion of at least one of the uncharted digital content items on the digital user ranking.

4. The incentivized electronic platform of claim 3, wherein the score is based on a third activity tracking parameter that is a peer-based share of the uncharted digital content items on the digital user rating.

5. The incentivized electronic platform of claim 2, wherein the score is based on a second activity tracking parameter that is a purchase of at least one of the uncharted digital content items on the digital user ranking.

6. The incentivized electronic platform of claim 2, wherein the predefined association of the user is a predominant location of the user aggregated over a location assessment period that is assigned to predefined regions received from a mobile device of the user having location recognition transceiver.

7. The incentivized electronic platform of claim 2, wherein the score is calculated in real-time.

8. The incentivized electronic platform of claim 7, wherein the score is displayed through a user interface device to the user.

9. The incentivized electronic platform of claim 8, wherein the score is displayed on digital ticker tape.

10. The incentivized electronic platform of claim 2, wherein the score is proportionally increased based on a risk factor associated with one or more of an activity tracking parameter.

11. The incentivized electronic platform of claim 2, wherein at least one of the uncharted digital content items of the uncharted digital register is received from the radio station within the predefined association.

12. The incentivized electronic platform of claim 2, wherein at least one of the uncharted digital content items of the uncharted digital register is received from a content creator associated with the item.

13. The incentivized electronic platform of claim 2, wherein the machine instructions when executed by the CPU implement the following further logic: transmit, to a user transceiver, a charted digital register of charted digital content items.

14. The incentivized electronic platform of claim 2, wherein the chart position is a statistical approval rating associated with a municipality.

15. The incentivized electronic platform of claim 2 wherein the uncharted digital content items are without chart positions at a state level.

16. The incentivized electronic platform of claim 15 wherein the uncharted digital content items being without chart positions at a local level.

17. The incentivized electronic platform of claim 2 wherein the uncharted digital content items are without a chart position on the Nielsen® charts.

18. The incentivized electronic platform of claim 2 wherein the stream count is from a public popularity index.

19. The incentivized electronic platform of claim 2 wherein the commercial streaming data provider is Nielsen®.

20. The incentivized electronic platform of claim 2 wherein the score is incremented if the stream count has increased over the period of time.

21. An incentivized electronic platform comprising:
   at least one processor including a computer having a central processing unit (CPU) for executing machine instructions and a memory for storing machine instructions that are to be executed by the CPU, the machine instructions when executed by the CPU implement the following logic:
      transmit, to a user transceiver, a digital register of digital content items, the digital content items being song names and/or artists, the digital content items being charted digital content items and/or uncharted digital content items, the charted digital content items having statistical approval ratings or chart positions at a national level and the uncharted digital content items being without statistical approval ratings or a chart positions at a national level;

receive, from the user transceiver, a digital user ranking based on a user selection from the digital register including at least one digital content item;

calculate a score associated with the digital user ranking over a period of time based on an activity tracking parameter of the digital content item on the digital user ranking relative to a predefined association of the user defined by a predominant location of the user aggregated over a location assessment period received from a positioning system transceiver of digital interaction devices that are assigned to predefined associations, the activity tracking parameter being a stream count from a commercial streaming data provider; and transmit an indication of the score associated with the digital user ranking.

* * * * *